United States Patent Office 3,658,731
Patented Apr. 25, 1972

3,658,731
POLYURETHANE FOAMS AND COMPOSITION
Thomas Richardson and Gerald O. Hustad, Madison, Wis., assignors to Wisconsin Alumni Research Foundation, Madison, Wis.
No Drawing. Filed Aug. 4, 1969, Ser. No. 847,401
Int. Cl. C08g 22/46, 22/08
U.S. Cl. 260—2.5 BD                     25 Claims

ABSTRACT OF THE DISCLOSURE

A foamed polyurethane produced by reaction in dimethylsulfoxide of dry whey and a polyisocyanate or of lactose and whey or yeast protein with polyisocyanate, with or without the addition of catalyst.

---

This invention relates to foamed polyurethanes and to a new and less expensive composition for use in the manufacture of same.

Foamed polyurethane plastics are generally prepared by reaction of (1) an organic polyol, polyetherpolyol or mixtures of polyols such as glycerol, trimethylol propane, butylene glycol, polyalkylene glycol such as polyethylene glycol, polypropylene glycol and polybutylene glycol, or polyhydroxypolyesters such as the reaction products of a polyhydroxyl alcohol, i.e. glycerol, ethylene glycol or propylene glycol with a polycarboxylic acid or anhydride such as adipic acid, succinic acid, malonic acid, maleic acid anhydride and the like with (2) a reactive organic polyisocyanate, such as an aliphatic diisocyanate as represented by hexamethylene diisocyanate or an aromatic diisocyanate, such as 2,4-tolylene diisocyanate and 2,6-tolylene diisocyanate and mixtures thereof.

The principal reaction involved in the preparation of polyurethane foams is that which occurs between the polyisocyanate and the polyhydroxypolyol compounds to yield a polyurethane polymer. The primary ingredients can be partially polymerized to a prepolymer with one of the ingredients present in an insufficient amount and which is later added with catalyst, foaming agent and surfactant to produce a foamed product, or the reaction can be carried out as a "one shot" technique wherein all of the ingredients are brought together simultaneously. The heat generated by the exothermic polymerization reaction causes the foaming agent, when present in the form of a low boiling hydrocarbon such as Freon, to vaporize whereby the vapors become entrapped to form the cellular structure. Still further, the mixture can be foamed by vigorous agitation to incorporate air into the resinous system.

Generally speaking, there are a number of deficiencies which, when overcome, would enhance the acceptance of polyurethane foamed plastics and enable more widespread use to be made thereof. One of the present drawbacks is the high cost of the raw materials which make up the foamed product. Another is the inability of the polyurethane foam to be self-extinguishing or non-burning without incorporation of foreign material such as compounds of phosphorus.

It is an object of this invention to produce a polyurethane plastic foam which is formulated of less expensive materials, which is self-extinguishing from the standpoint of flammability, and which gives good foaming characteristics from the standpoint of a more cohesive foam, uniformity of the cellular structure, the strength characteristics of the product that is formed, the predominantly open celled nature of the product that is formed, and the rate of reaction to set the foamed reaction product.

It has been found, in accordance with the practice of this invention, that a new and less expensive polyurethane foam, having the characteristics described, can be produced by the reaction of a polyisocyanate with a whey powder, such as a sweet whey and/or an acid whey, in dimethylsulfoxide and preferably, though not necessarily, in the presence of a catalyst.

Representative of the whey powders that can be used in the practice of this invention are the sweet whey powders from Cheddar, Swiss or Blue cheese, or acid whey powders from cottage cheese. The following are typical analyses of the dried, sweet and acid whey powders:

|  | Percent | | |
|---|---|---|---|
|  | Acid whey powder | Sweet whey powder 1 | Sweet whey powder 2 |
| Lactose | 65.0 | 71.2 | 72.4 |
| Protein | 12.0 | 12.9 | 12.5 |
| Lacticles acid | 6.0 | 2.3 |  |
| Fat |  | 1.1 | 1.2 |
| Water | 2.5 | 4.5 | 6.2 |
| Ash | Present | 8.0 | 7.7 |
| Ca | Present | Present | 0.68 |
| P | Present | Present | 0.58 |
| Vit. B complexes | Present | Present | Present |

Any of the organic polyisocyanates conventionally employed for reaction with the polyols or polyetherpolyols in the manufacture of polyurethanes can be used in the practice of this invention. The particular polyisocyanate selected will depend somewhat upon its reaction rate in the reaction system and the properties desired in the final foamed product.

However, in the practice of this invention, it is preferred to make use of one or a mixture of aromatic diisocyanates because of their higher reaction rate. Best use is made of 2,4-tolylene diisocyanate and 2,6-tolylene diisocyanate or mixtures thereof (TDI) or polymethylene polyphenylisocyanate (PAPI) and the invention will hereinafter be described with reference thereto. Foams with higher compressive strengths (10% deflection) can be produced with TDI in the ratio of 80 parts 2,4 and 20 parts 2,6-tolylene diisocyanate by comparison with polymethylene polyphenylisocyanate. The latter gives a foam which is more consistent from the standpoint of uniformity of cell structure and density control.

The tolylene diisocyanate can be reacted with the whey in the weight ratio of more than 72 parts by weight up to 130 parts by weight of the diisocyanate per 100 parts by weight of whey powder. When polymethylene polyphenylisocyanate is reacted with whey, more than 109 parts by weight of the polyisocyanate up to 198 parts by weight per 100 parts by weight of whey, and preferably 130 to 150 parts by weight of the polyisocyanate to 100 parts by weight of whey, is used. Others of the di- and polyisocyanates can be substituted for the aromatic diisocyanate in amounts equivalent thereto, when calculated on the basis of molecular equivalents.

The dimethylsulfoxide presents a unique combination with the whey powder and polyisocyanate. Of considerable importance is the stability of the system formulated with the dimethylsulfoxide, resulting in part from the solubility of the components to the extent that it is capable of being dissolved with the remainder dispersed in the dimethylsulfoxide and the chemical stability that is imparted to the system by the use of dimethylsulfoxide. In addition, it has been found that the dimethylsulfoxide functions in a manner to provide a catalytic action which makes it unnecessary to employ the usual catalysts for the reaction of a polyhydroxy compound with the polyisocyanate. When used in combination with a catalyst, a synergistic reaction is experienced which yields an improved polymerization to form a lower density foamed polyurethane. Favorable also to the combination which makes use of dimethylsulfoxide as a component in the foamable composition is its low toxicity and complete miscibility with water in all proportions.

Many of these same characteristics are incapable of being developed with other solvent systems in the combination described. In the practice of this invention, the dimethylsulfoxide is employed in an amount within the range of 35 to 85 parts by weight per 100 parts by weight and preferably in an amount within the range of 50 to 65 parts by weight per 100 parts by weight of whey powder.

Unlike other reactions to produce foamed polyurethanes by reaction of a polyhydroxy compound or polyol with a polyisocyanate, a catalyst is not essential since catalytic effect is secured by the intimate presence of dimethylsulfoxide. However, as previously pointed out, use can be made of a separate catalyst in addition to the dimethylsulfoxide, to accelerate the polymerization reaction. For this purpose, use can be made of the conventional catalysts such as an organo tin compound and/or a tertiary amine catalyst. The tertiary amines are generally highly selective in accelerating the water-isocyanate reaction to produce carbon dioxide as a foaming agent in the reaction. On the other hand, the organo tin compounds generally promote the polymerization reaction but exhibit low orders of activity in evolution of carbon dioxide from the isocyanate. Thus the tertiary amines and other catalysts which accelerate the water-isocyanate reaction are favored when water is being relied upon to generate carbon dioxide as a blowing agent while the organo tin catalysts would be selected where fast polymerization reaction is desirable.

The organo tin catalysts are effective in the system of this invention since the activity increases with increase in temperature and the temperature increases to a level as high as 100° C. by reason of the added catalytic effect resulting from the presence of dimethylsulfoxide. Thus the reaction time is greatly decreased by a combination which makes use of an organo tin catalyst with dimethylsulfoxide, with whey powder and diisocyanate, representing the preferred practice of this invention.

The organo tin catalyst used most frequently in this invention is a tetravalent organo tin compound marketed under the designation Carston T–52N–50 by Carlisle Chemical works and having a tin content of 11.5–12.5% by weight, a chlorine content of 0.25% max., a viscosity of 50 cps. max., a flash point (C.O.C.) of 425° C., a refractive index at 25° C. of 1.4886, and a specific gravity of 1.085–1.110. Organo tin catalysts which can be used are represented by stannous octoate and dibutyl tin dilaurate. Representative of the tertiary amine catalysts are tetramethylbutanediamine and triethylenediamine. Successful use has been made of a tertiary amine catalyst marketed under the name Dabco 33–LV (available from Houdry Process Co., Chicago, Ill.) (1 part by weight triethylenediamine and 2 parts by weight dipropylene glycol).

With tolylene diisocyanate, foams having a density as low as 2 pounds per cubic foot can be produced with the use of an organo tin catalyst while the slower acting tertiary amine catalysts produce foams having higher densities of about 2.5 to 5 pounds per cubic foot. With the less reactive polymethylene polyphenylisocyanate, a combination of organo tin and tertiary amine as additional catalysts has been used more extensively though either catalyst may be used alone.

In the practice of this invention, use is made of a catalyst of the type described in an amount within the range of 0 to 2 parts by weight per 100 parts by weight of whey powder and preferably in an amount within the range of 0.3 to 1.6 parts by weight per 100 parts by weight of whey powder.

Generation of a foam in the production of a foamed polyurethane may be effected in a conventional manner, or by vigorous agitation during reaction to incorporate air which becomes entrapped in the cured resin to define the porosity therein, or by the incorporation of a low boiling hydrocarbon liquid that is readily vaporized at reaction temperature to produce vapors which become entrapped in the resin forming ingredients to define the porosity, as by the introduction of a small amount of a low boiling chlorofluoromethane or ethane such as Freon liquids manufactured by the Du Pont Company. It is also possible to rely upon the development of porosity by the generation of carbon dioxide in response to the reaction between water and isocyanate groups of the polyisocyanate since water is inherently present in the whey powder in uniform distribution throughout the whey and somewhat in the most desirable amounts. The optimum amount of water for use in the generation of carbon dioxide as a blowing agent with TDI is about 7.9% whereas the optimum amount for use with polyethylene polyphenylisocyanate is about 12 to 13% based upon the weight of the whey powder to produce foams with a density of approximately 2 pounds per cubic foot.

Since the amount of water inherently present in dry whey powders generally ranges between 2% to 7% by weight, little if any additional water need be incorporated into the mix. Thus blowing can be effected without adding low boiling hydrocarbons. The uniform distribution of water inherently present in the whey powder favors the distribution of the pores throughout the cross-section of the foamed product.

It will be seen from the analysis of the powdered whey that the whey contains lactose and protein as the principal ingredients with the amount varying, depending somewhat upon the source of the whey and its method of preparation. The protein content of whey will vary usually within the range of 8% to 14% of the whey. The presence of the protein with the lactose, in the described amounts, has been found to produce foamed polyurethanes in which the foam itself along with the outer skin is not friable and in which the foamed product is more coadhesive and is characterized by a more uniform cellular structure in comparison to foams made with pure lactose, with no protein present. It is believed that the amino groups present in the whey proteins enter into the reaction with isocyanate groups of the polyisocyanate to provide additional crosslinking in the foamed polyurethane which seems to improve coadhesive strength and cell structure and reduce friability of the foam itself along with the outer surface of the foamed product. It will be understood that modification of the whey by adding lactose or by adding protein can be achieved to vary the ratio of protein to lactose in the reactive composition. However, it is undesirable to make use of a composition containing total protein in an amount less than 4% by weight or more than 20% by weight of the lactose-protein combination. In the preferred practice, the protein is employed in the amount that is naturally found in the whey powder or in an amount within the range of 8% to 14% by weight.

In addition, it has been found that the presence of whey protein makes it unnecessary to make use of surfactants or other cell-controlling agents, such as the polyglycol silicone polymers, which are normally added in small amounts to control cell formation and texture.

The calcium and phosphorus compounds, which comprise the principal components of the high ash present in whey powder and their particular tie-in with the polyurethane foam that is formed by reaction between the whey and polyisocyanate, is believed, at least in part, responsible for the novel and unexpected self-extinguishing properties of the foamed polyurethane formed by the practice of this invention.

Attempts have been made to substitute the whey powders by equivalent amounts of lactose and other sugars and protein for reaction with the polyisocyanate in the presence of dimethylsulfoxide. It has been found that a successful foam which is somewhat comparable to the polyurethane foams produced by the reaction of whey powder with polyisocyanate and dimethylsulfoxide can be secured when the protein is torula yeast. Use can generally be made of proteins derived from animal source. Equivalent results cannot be secured with some vegetable proteins, such as corn protein, zein and the like, in the combination with lactose, polyisocyanate and dimethylsulfoxide in the manufacture of foamed polyurethanes. It appears that some proteins are incapable of the same reaction results obtained from whey powder or by the use of lactose and a protein in equivalent amounts.

While lactose represents the preferred sugar employed in combination with the protein or added to the dry whey, as previously described, other sugars such as dextrose, maltose and sucrose can be substituted in whole or part for the lactose, in equivalent amounts.

When formulated of lactose and a protein, the amount of protein can be above that naturally present in whey powder such that it is possible to formulate for an amount of protein in the combined mixture of lactose and protein within the range of 4% to 20% by weight of protein but with best results being obtained when the protein is present in an amount within the range of 8% to 14%, as in natural whey powder. The dimethylsulfoxide, polyisocyanate and catalyst remain the same as that described for the formulation of the composition with whey powder, as in the preferred practice of this invention. Phosphorus compounds can be added to achieve non-burning properties.

In the formulations described, finely divided pigment and fillers suuch as calcium carbonate, calcium sulphate, calcium oxide, aluminum powder, aluminum oxide, carbon black and the like can be incorporated for special applications of foamed polyurethanes produced in accordance with the practice of this invention. Similarly, glass fibers in amounts up to 5% by weight can be introduced to impart strength and toughness to the foamed polyurethane. Such glass fibers are beneficial in the foamed product by their highly hydrophilic surfaces which enhance the distribution of carbon dioxide generated by moistuure on the glass fiber surfaces to improve the formation and distribution of pores. By reason of the hydrophilic groups predominating on the glass fiber surfaces, a strong interbonded relationship can be established between the glass fibers and the cured resinous materials.

Having described the basic concepts of this invention, illustration will now be made by way of the following examples which are given by way of illustration, but not by way of limitation:

EXAMPLES 1–8

The foams which are tabulated as to composition were all prepared as follows with the foam produced by Example 1 representing the normal practice with propoxylated sorbitol as the polyol.

The whey powder, and lactose when used, was taken up by way of solution in dispersion in the dimethylsulfoxide in amounts to obtain the desired viscosity and additional water was introduced to the solution. The catalyst and polyisocyanate were added and the ingredients mixed with stirring for 15 to 60 seconds, using a solubility index mixer manufactured by Central Scientific Company. The foam ingredients were stirred until the reaction was very exothermic and the foam was just beginning to rise. Rise time varied from 15 to 30 seconds, at the end of which time the foam was set. Mixing and foaming was carried out in a paper container and the foamed product conformed to the shape of the container.

FORMULATIONS AND FOAMING CHARACTERISTICS

| Example | *1 | 2 | 3 | 4 | 5 | 6 | 7 | 8 |
|---|---|---|---|---|---|---|---|---|
| Formulation: | | | | | | | | |
| Propoxylated sorbitol (OH-490) | 100 | | | | | | | |
| Sweet cheese whey powder (6.5% H₂O) | | 100 | 100 | 70 | | 70 | 70 | 70 |
| Acid cheese whey powder (2.5% H₂O) | | | | | 70 | | | |
| Lactose (5.0% H₂O) | | | | 30 | 30 | 30 | 30 | 30 |
| Dimethyl sulfoxide (DMSO) | | 66 | 55 | 66 | 49.5 | 55 | 60.5 | 60.5 |
| Dabco 33-LV | 1.0 | | | | 1.3 | 1.3 | 1.3 | 1.3 |
| Carstan T-52N-50 | | 0.8 | 0.8 | 0.8 | 0.3 | 0.3 | 0.3 | 0.3 |
| Tetramethylguanidine | 0.7 | | | | | | | |
| Fluorotrichloromethane (F-11B) | 38 | | | | | | | |
| Water | | 1.4 | 6.4 | 1.8 | 2.5 | 6.8 | 4.4 | 4.4 |
| Polymethylene polyphenylisocyanate (PAPI) 31% NCO (NCO functionality of about 3), viscosity at 25° C. of 250 cps | 123 | | 130.8 | | | 130.8 | 65.4 | 43.6 |
| Tolylene diisocyanate (80% 2,4 isomer; 20% 2,6 isomer) | | 85.5 | | 85.5 | 85.5 | | 42.8 | 57 |
| Foaming characteristics: | | | | | | | | |
| Stirring time, sec | 60+ | 15-17 | 55-60 | 15-17 | 17-20 | 55-60 | 40-45 | 30-35 |
| Rise time, sec | 150-175 | 15-17 | 25-30 | 15-17 | 15-20 | 25-30 | 15-20 | 15-20 |
| Tack-free time, sec | 150-175 | 15-17 | 25-30 | 15-17 | 15-20 | 25-30 | 15-20 | 15-20 |

*Contained also 1.1 parts of L5410, a rigid foam surfactant from Freeman Chemical Co.

The whey-based foams had densities within the range of 2 to 5 p.c.f. with lower densities being obtained by the use of organo tin catalysts and higher densities being obtained by the use of tertiary amine catalysts.

The structures appear to be characterized by an open cell structure. The foams were self-extinguishable in that they did not support flame and they exhibited excellent dimensional stability at temperatures as low as −23° C.

Such properties suggest widespread use of the polyurethane foams of this invention for acoustical insulation, soundproofing, and packaging.

The following examples will illustrate the preparation of a foamed polyurethane formulated of lactose and other sugars and torula yeast, the latter of which comprises 52% protein, 7.4% minerals as ash (K, P & Ca), 27% to 28% carbohydrate, 5.7% water, 0.4% non-protein nitrogen and 0.5% fiber.

EXAMPLE 9

| | Grams |
|---|---|
| Lactose | 75 |
| Torula yeast | 25 |
| Tolylene diisocyanate (80% 2,4-isomer and 20% 2,6 - isomer) | 103.5 |
| Dimethylsulfoxide | 55 |
| Organo tin catalyst (Carstan T-52N-50) | 0.25 |
| Water | 5 |

EXAMPLE 10

| | Grams |
|---|---|
| Dextrose | 75 |
| Dried torula yeast | 25 |
| Dimethylsulfoxide | 44 |
| Water | 4 |
| Catalyst (Carstan T-52N-50) | 0.3 |
| Tolylene diisocyanate | 85.5 |

EXAMPLE 11

| | Grams |
|---|---|
| Powdered maltose | 75 |
| Dried torula yeast | 25 |
| Dimethylsulfoxide | 44 |
| Water | 4 |
| Organo tin catalyst | 0.38 |
| Tolylene diisocyanate | 85.5 |

EXAMPLE 12

| | Grams |
|---|---|
| Powdered sucrose | 75 |
| Dried torula yeast | 25 |
| Dimethylsulfoxide | 44 |
| Water | 4 |
| Organo tin catalyst | 0.38 |
| Tolylene diisocyanate | 85.5 |

The processing to form the foamed polyurethane followed the same procedure as previously described with reference to Examples 1-8, only the sugar and yeast were first dispersed together in the dimethylsulfoxide. The texture of the foamed product was not as good as that produced with whey powder and more diisocyanate was required, but a good foam was secured, having densities less than 3 pounds per cubic foot.

It will be apparent from the foregoing that there is provided a new and comparable composition for the manufacture of foamed polyurethane plastics which is characterized by low cost, low density, moderate strength, uniform cellular structure, a self-extinguishing flammability property, and a highly opencelled structure. The composition is characterized further by a high reaction rate with controlled porosity without the need for the usual catalyst, surfactant and the like, and in which the raw materials are readily available over a wide section of the country for the manufacture of rigid and semi-rigid polyurehane foamed products and coatings.

It will be understood that changes may be made in the details of formulation and processing without departing from the spirit of the invention, especially as defined in the following claims.

We claim:

1. In the manufacture of a foamed polyurethane, reacting sugar selected from the group consisting of lactose, dextrose, maltose and sucrose and mixtures thereof, a protein found in whey powder or torula yeast in which the protein is present in an amount within the range of 4% to 20% by weight of the combined sugar and protein, and an organic polyisocyanate in the presence of dimethylsulfoxide and foaming the reaction mixture during the polymerization reaction to form a foamed polyurethane.

2. The method as claimed in claim 1 in which the protein comprises 8% to 14% by weight of the combined sugar and protein.

3. The method as claimed in claim 1 in which the sugar is lactose.

4. The method as claimed in claim 1 in which the dimethylsulfoxide is present in the reaction composition in the ratio of 35 to 85 parts by weight per 100 parts by weight of the combined weight of sugar and protein.

5. The method as claimed in claim 1 in which the dimethylsulfoxide is present in the reaction composition in the ratio of 50 to 65 parts by weight per 100 parts by weight of the combined weight of sugar and protein.

6. The method as claimed in claim 1 in which the polyisocyanate is polymethylene polyphenylisocyanate and is present in the ratio of 109 to 198 parts by weight per 100 parts by weight of the combined sugar and protein.

7. The method as claimed in claim 1 in which the sugar and protein are first taken-up in the dimethylsulfoxide before the addition of the polyisocyanate.

8. The method as claimed in claim 1 which includes a catalyst.

9. The method as claimed in claim 1 in which the polyisocyanate is selected from the group consisting of 2,4-tolylene diisocyanate, 2,6-tolylene diisocyanate, and mixtures thereof and is present in the ratio of 72 to 130 parts by weight per 100 parts by weight of the combined sugar and protein.

10. The method as claimed in claim 9 in which the catalyst is present in an amount within the range of 0.3 to 1.6 parts by weight per 100 parts by weight of sugar and protein.

11. The method as claimed in claim 1 in which water is added in an amount to provide a total water content within the range of 2% to 13% by weight of sugar and protein for reaction with the isocyanate groups to form carbon dioxide as a blowing agent.

12. In the manufacture of foamed polyurethanes comprising reacting dry whey and a polyisocyanate in the presence of dimethylsulfoxide and foaming the reaction mixture during the polymerization reaction to form a foamed polyurethane.

13. The method as claimed in claim 12 in which the whey is in the form of a dry powdered whey and contains protein in an amount within the range of 8% to 14% by weight.

14. The method as claimed in claim 12 in which the dimethylsulfoxide is present in an amount within the range of 35 to 85 parts by weight per 100 parts by weight of whey.

15. The method as claimed in claim 12 in which the dimethylsulfoxide is present in an amount within the range of 50 to 65 parts by weight per 100 parts by weight of whey.

16. The method as claimed in claim 12 in which the polyisocyanate is selected from the group consisting of 2,4-tolylene diisocyanate, 2,6-tolylene diisocyanate, and mixtures thereof and is present in the ratio of 72 to 130 parts by weight per 100 parts by weight of whey powder.

17. The method as claimed in claim 12 in which the polyisocyanate is polymethylene polyphenylisocyanate and is present in the ratio of 109 to 198 parts by weight per 100 parts by weight of whey powder.

18. The method as claimed in claim 12 in which the polyisocyanate is present in an amount to provide 0.82 to 1.12 NCO groups by weight per 100 parts by weight of whey powder.

19. The method as claimed in claim 15 in which the whey is taken-up in dimethylsulfoxide before addition of the polyisocyanate.

20. The method as claimed in claim 12 which includes a catalyst in an amount up to 2% by weight of whey powder.

21. The method as claimed in claim 12 in which the materials are present in an amount to provide 0.82 to 1.12 NCO groups by weight of the polyisocyanate per 100 parts by weight of the whey powder and in which dimethylsulfoxide is present in an amount within the range of 35 to 85 parts by weight per 100 parts by weight of the whey powder.

22. A foamed polyurethane comprising the polymerization reaction product of whey powder and a polyisocyanate in the presence of dimethylsulfoxide.

23. A foamed polyurethane as claimed in claim 22 in which the cellular structure has been generated by the reaction between water and isocyanate groups of the polyisocyanate to produce carbon dioxide during the polymerization reaction.

24. A foamed polyurethane as claimed in claim 22 in which the polyisocyanate is selected from the group consisting of 2,4-tolylene diisocyanate, 2,6-tolylene diisocyanate and mixtures thereof, and polymethylene polyphenylisocyanate.

25. A foamed polyurethane produced by the method of claim 1.

References Cited

UNITED STATES PATENTS 3,210,300  10/1965  Leibu _____ 260—2.5
3,075,930  1/1963  Stewart et al. _____ 260—2.5

DONALD E. CZAJA, Primary Examiner
C. W. IVY, Assistant Examiner

U.S. Cl. X.R.

260—2.5 AG, 2.5 AJ, 2.5 AM, 6